UNITED STATES PATENT OFFICE.

GEORGE E. STERRY, OF NEW YORK, N. Y.

IMPROVEMENT IN COMPOUNDS FOR FLAVORING AND PRESERVING TOBACCO.

Specification forming part of Letters Patent No. 166,155, dated July 27, 1875; application filed April 10, 1875.

*To all whom it may concern:*

Be it known that I, GEORGE E. STERRY, of the city, county, and State of New York, have invented a new and useful Improvement in Compound for Sweetening, Seasoning, Flavoring, and Preserving Tobacco, of which the following is a specification:

The object of this invention is to apply the seasoning to the tobacco in such a way as to obtain its best practical effect, and at the same time in such a way as not to waste the seasoning by allowing it to be absorbed by the stems.

The invention consists in an improved compound for sweetening, seasoning, flavoring, and preserving tobacco, formed by mixing powdered salt with powdered licorice root, as hereinafter fully described.

My improved compound is prepared as follows: Pure rock-salt in any desired quantity is ground to a fine powder in any suitable mill, and is immediately mixed with powdered licorice root in sufficient quantity to absorb the moisture of the salt and prevent it from caking. For ordinary purposes I use one pound of the powdered licorice root to nine pounds of the powdered salt, but this proportion may be varied if desired. The compound thus prepared is sprinkled upon the leaf as it is being packed into the cutter-box, and is also sprinkled upon the cut tobacco while being dressed. The powdered salt thus mixed with the powdered compounds may be kept in the factory ready for use at any time, and will not cake. This invention overcomes the objections and difficulties heretofore encountered in using salt upon tobacco. Tobacco has been salted by dipping the leaf into brine. In this case the stems, being porous, absorb a large proportion of the salt, which is thus wasted, and the leaf becomes coated with a slight glaze of salt crystals, which renders the leaf crisp or brittle, and very greatly increases the amount of shorts when cut, and at the same time the tobacco does not become sufficiently salted. When powdered salt is taken into the factory it cakes, so that it cannot be used without crushing it in a mortar, consuming much time and increasing the expense.

The test for determining whether other tobacco-sweetening, coloring, or flavoring substances are equivalents of the licorice in this combination, may, therefore, be readily gathered from this specification.

What I claim is—

An improved compound for sweetening, seasoning, flavoring, and preserving tobacco, formed of powdered salt and licorice root, as set forth.

GEO. E. STERRY.

Witnesses.
  JAMES T. GRAHAM,
  T. B. MOSHER.